United States Patent
Kobayashi

(10) Patent No.: US 11,441,020 B2
(45) Date of Patent: Sep. 13, 2022

(54) TRANSMISSION BELT

(71) Applicant: BANDO CHEMICAL INDUSTRIES, LTD., Kobe (JP)

(72) Inventor: Shogo Kobayashi, Kobe (JP)

(73) Assignee: BANDO CHEMICAL INDUSTRIES, LTD., Kobe (JP)

(*) Notice: Subject to any disclaimer, the term of this patent is extended or adjusted under 35 U.S.C. 154(b) by 0 days.

(21) Appl. No.: 17/543,477

(22) Filed: Dec. 6, 2021

(65) Prior Publication Data

US 2022/0089843 A1    Mar. 24, 2022

Related U.S. Application Data

(63) Continuation of application No. PCT/JP2020/018373, filed on May 1, 2020.

(30) Foreign Application Priority Data

Jun. 7, 2019   (JP) .............................. JP2019-107202

(51) Int. Cl.
| | | |
|---|---|---|
| *C08L 9/00* | (2006.01) | |
| *C08L 11/00* | (2006.01) | |
| *C08K 3/04* | (2006.01) | |
| *C08K 7/02* | (2006.01) | |
| *C08K 3/36* | (2006.01) | |
| *C08L 23/08* | (2006.01) | |
| *B60C 1/00* | (2006.01) | |

(52) U.S. Cl.
CPC .................. *C08L 9/00* (2013.01); *C08K 3/04* (2013.01); *C08K 3/36* (2013.01); *C08K 7/02* (2013.01); *C08L 11/00* (2013.01); *C08L 23/0815* (2013.01); *B60C 2001/0066* (2013.01); *C08L 2205/16* (2013.01)

(58) Field of Classification Search
CPC ........ C08L 9/00; C08L 2205/16; C08L 11/00; C08L 23/0815; C08K 3/04; C08K 3/36; C08K 7/02; B60C 2001/0066
See application file for complete search history.

(56) References Cited

U.S. PATENT DOCUMENTS

| | | | |
|---|---|---|---|
| 6,177,202 B1 | 1/2001 | Takehara et al. | |
| 6,361,462 B1 | 3/2002 | Takada et al. | |
| 2013/0085028 A1 | 4/2013 | Yamada et al. | |
| 2018/0045273 A1* | 2/2018 | Kobayashi | .............. B32B 25/14 |

FOREIGN PATENT DOCUMENTS

| | | |
|---|---|---|
| CN | 103026098 A | 4/2013 |
| DE | 19854017 A1 | 5/2000 |
| EP | 2 584 217 A1 | 4/2013 |
| JP | 2016-205555 A | 12/2016 |
| JP | 2016-211586 A | 12/2016 |
| JP | 2018-185041 A | 11/2018 |
| KR | 10-2013-0041095 A | 4/2013 |
| WO | 2011/158586 A1 | 12/2011 |

OTHER PUBLICATIONS

JP Office Action dated Aug. 25, 2020 as received in Application No. 2020-526641.
JP Decision to Grant dated Apr. 27, 2021 as received in Application No. 2020-526641.

* cited by examiner

*Primary Examiner* — Angela C Scott
(74) *Attorney, Agent, or Firm* — Maschoff Brennan

(57) ABSTRACT

A power transmission belt includes a pulley non-contacting portion made of a rubber composition. The rubber composition contains a rubber component, cellulose-based fine fibers, and a non-carbon black hydrophilic inorganic filler, and contains no carbon black or contains carbon black in an amount of less than 20 parts by mass relative to 100 parts by mass of the rubber component.

9 Claims, 2 Drawing Sheets

TRANSMISSION BELT

CROSS-REFERENCE TO RELATED APPLICATION

This is a continuation of International Application No. PCT/JP2020/18373 filed on May 1, 2020, which claims priority to Japanese Patent Application No. 2019-107202 filed on Jun. 7, 2019. The entire disclosures of these applications are incorporated by reference herein.

BACKGROUND

The present invention relates to a power transmission belt.

It has been known that reinforcement is made by adding cellulose-based fine fibers to a rubber composition forming a belt body of a power transmission belt.

For example, Japanese Unexamined Patent Publication No. 2016-205555 discloses a toothed belt having a belt body made of a rubber composition containing cellulose-based fine fibers.

SUMMARY

The present invention is a power transmission belt including a pulley non-contacting portion made of a rubber composition, the rubber composition containing a rubber component, cellulose-based fine fibers, and a non-carbon black hydrophilic inorganic filler and containing no carbon black or containing carbon black in an amount of less than 20 parts by mass relative to 100 parts by mass of the rubber component.

DESCRIPTION OF EMBODIMENT

An embodiment will be described in detail below.

First Embodiment

Figure 1:
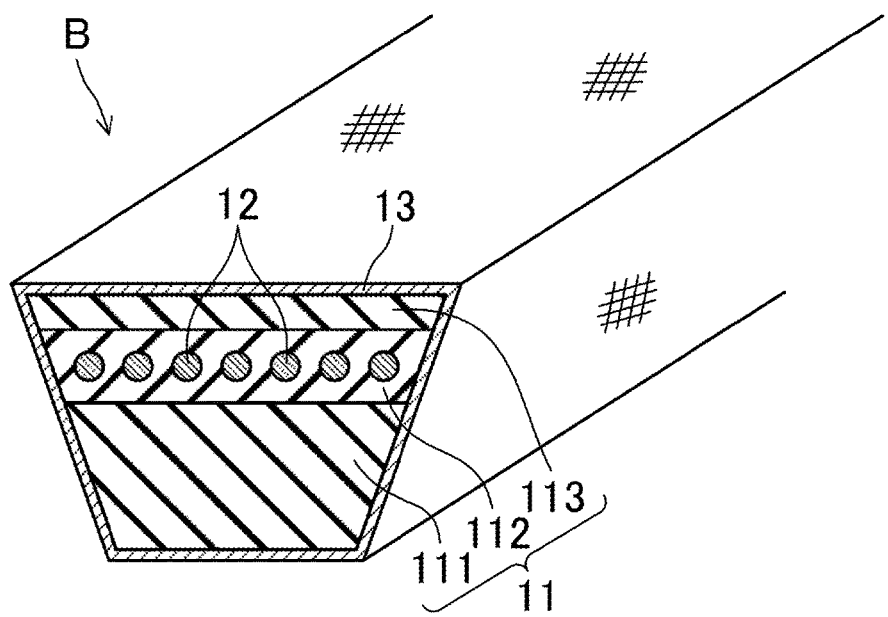
FIG. 1 is a perspective view of a piece of a wrapped V-belt of a first embodiment.

FIG. 1 illustrates a wrapped V-belt B (a power transmission belt) of a first embodiment. The wrapped V-belt B of the first embodiment is a friction transmission belt used as a power transmission member of, e.g., an agricultural machine or an industrial machine.

The wrapped V-belt B of the first embodiment includes an endless belt body 11 made of rubber. The cross-sectional shape of the belt body 11 is a trapezoidal shape whose width increases from an inner side of the belt to an outer side of the belt. The belt body 11 includes three layers of a compressed rubber layer 111 constituting the inner side of the belt, an adhesive rubber layer 112 as an intermediate portion in a belt thickness direction, and a stretch rubber layer 113 constituting the outer side of the belt. The wrapped V-belt B of the first embodiment includes a cord 12 embedded in an intermediate portion of the adhesive rubber layer 112 in the belt thickness direction. The cord 12 is provided to extend in a circumferential direction to form a helical pattern with pitches in a belt width direction. The wrapped V-belt B of the first embodiment includes cover fabric 13 provided to cover the entire belt body 11.

The compressed rubber layer 111, the adhesive rubber layer 112, and the stretch rubber layer 113 are all made of crosslinked rubber compositions. These rubber compositions are each obtained by crosslinking a sheet-shaped uncrosslinked rubber composition, and is suitably arranged such that a grain direction thereof corresponds to the belt width direction and a non-grain direction thereof corresponds to a belt length direction. The wrapped V-belt B of the first embodiment is used with the wrapped V-belt B being fitted in a V-groove of a pulley. The cover fabric 13 on both side surfaces of the wrapped V-belt B thus forms pulley contacting portions. Thus, each of the compressed rubber layer 111, the adhesive rubber layer 112, and the stretch rubber layer 113 of the belt body 11 forms a pulley non-contacting portion made of the rubber composition contained in the wrapped V-belt B of the first embodiment.

At least one of the compressed rubber layer 111, the adhesive rubber layer 112, or the stretch rubber layer 113 is made of a rubber composition (hereinafter referred to as a "rubber composition A") containing a rubber component, cellulose-based fine fibers, and a non-carbon black hydrophilic inorganic filler and not containing carbon black or containing carbon black in an amount of less than 20 parts by mass relative to 100 parts by mass of the above-described rubber component.

Generally, the rubber composition containing the cellulose-based fine fibers cannot be expected to have a high wear resistance. However, according to the wrapped V-belt B of the first embodiment, the pulley non-contacting portion requiring no wear resistance is made of the rubber composition A containing the rubber component, the cellulose-based fine fibers, and the non-carbon black hydrophilic inorganic filler and not containing carbon black or containing carbon black in an amount of less than 20 parts by mass relative to 100 parts by mass of the rubber component. Excellent durability can thus be obtained. The reason for this is assumed to be as follows. At the pulley non-contacting portion requiring no wear resistance, the interaction between the cellulose-based fine fibers and the hydrophilic inorganic filler having a high affinity with the cellulose-based fine fibers enhances a reinforcing effect of the cellulose-based fine fibers, and the absent of the carbon black or a small content of carbon black leads to a reduction in heat generation, and the potential of the cellulose-based fine fibers is effectively exhibited accordingly.

Any one of the compressed rubber layer 111, the adhesive rubber layer 112, or the stretch rubber layer 113 may be made of the rubber composition A, or all of these layers may be made of the rubber composition A. At least the compressed rubber layer 111 is suitably made of the rubber composition A in terms of obtaining excellent durability.

Examples of the rubber component in the rubber composition A include: chloroprene rubber (CR); ethylene-α-olefin elastomer such as ethylene propylene copolymer (EPR), ethylene-propylene-diene terpolymer (EPDM), ethylene-octene copolymer, and ethylene-butene copolymer; chlorosulfonated polyethylene rubber (CSM); and hydrogenated acrylonitrile rubber (H-NBR), and the like. The rubber component is suitably one type of these rubbers or a rubber blend of two or more types of these rubbers, more suitably contains chloroprene rubber (CR), much more suitably contains sulfur-modified chloroprene rubber (sulfur-modified CR) in terms of obtaining excellent durability.

The cellulose-based fine fibers in the rubber composition A are contained and dispersed in the rubber component. The cellulose-based fine fibers are a fiber material derived from cellulose fine fibers made of a cytoskeleton component of a plant cell wall. The cytoskeleton component is obtained by untangling plant fibers. Examples of raw plants for the cellulose-based fine fibers include wood, bamboo, rice plants (rice straw), potato, sugarcane (bagasse), water plants, and seaweed. Among these raw plants, wood is suitable.

The cellulose-based fine fibers include cellulose fine fibers themselves and hydrophobized cellulose fine fibers obtained by hydrophobing the cellulose fine fibers. The cellulose-based fine fibers suitably contain one or both of these fibers.

The cellulose-based fine fibers include those manufactured by mechanically-defibrating means and having a high aspect ratio and those manufactured by chemically-defibrating means and having a needle crystal. The cellulose-based fine fibers suitably contain one or both of these fibers, more suitably contain cellulose-based fine fibers manufactured by mechanically-defibrating means in terms of obtaining excellent durability.

The average fiber diameter of the cellulose-based fine fibers is, for example, 10 nm or more to 1000 nm or less. The average fiber length of the cellulose-based fine fibers is, for example, 0.1 μm or more to 1000 μm or less. The content of the cellulose-based fine fibers in the rubber composition A is suitably 1 part by mass or more to 20 parts by mass or less, more suitably 1.5 parts by mass or more to 10 parts by mass or less, much more suitably 2 parts by mass or more to 5 parts by mass or less, relative to 100 parts by mass of the rubber component, in terms of obtaining excellent durability.

The hydrophilic inorganic filler in the rubber composition A are contained and dispersed in the rubber component. The hydrophilic inorganic filler includes silica, layered silicate, calcium carbonate, clay, and the like. The hydrophilic inorganic filler suitably contains one type or two or more types of these substances, more suitably contains silica in terms of obtaining excellent durability. The content of the hydrophilic inorganic filler in the rubber composition A is suitably 3 parts by mass or more to 50 parts by mass or less, more suitably 15 parts by mass or more to 35 parts by mass or less, relative to 100 parts by mass of the rubber component so, in terms of obtaining excellent durability.

The content of the hydrophilic inorganic filler in the rubber composition A is suitably greater than the content of the cellulose-based fine fibers. The ratio (the content of hydrophilic inorganic filler/content of cellulose-based fine fibers) of the content of the hydrophilic inorganic filler to the content of the cellulose-based fine fibers in the rubber composition A is suitably 1.0 or more to 15 or less, more suitably 7 or more to 12 or less, in terms of obtaining excellent durability.

The rubber composition A suitably contains no carbon black in terms of obtaining excellent durability. If the rubber composition A contains carbon black, examples of the carbon black include: channel black; furnace black such as SAF, ISAF, N-339, HAF, N-351, MAF, FEF, SRF, GPF, ECF, and N-234; thermal black such as FT and MT; and acetylene black. The carbon black suitably contains one type or two or more types of these substances, more suitably contains carbon black having an arithmetic average particle diameter of 50 μm or less, much more suitably contains FEF, in terms of obtaining excellent durability. The carbon black is also contained and dispersed in the rubber component.

The content of the carbon black in the rubber composition A is less than 20 parts by mass relative to 100 parts by mass of the rubber component, suitably 10 arts by mass or less, much more suitably 5 parts by mass or less, in terms of obtaining excellent durability. The sum of the content of the hydrophilic inorganic filler and the content of the carbon black in the rubber composition A is suitably 20 parts by mass or more to 40 parts by mass or less, more suitably 29 parts by mass or more to 35 parts by mass or less, relative to 100 parts by mass of the rubber component, in terms of obtaining excellent durability.

The rubber composition A may contain, as other rubber compound ingredients, a plasticizer, a processing aid, an antioxidant, a crosslinking agent, a vulcanization accelerator, a vulcanization accelerator aid, and the like.

The cord 12 is made of a twisted yarn of fibers, such as polyester fibers, polyethylene naphthalate fibers, aramid fibers, and vinylon fibers. The cord 12 is suitably subjected to adhesion treatment such as RFL treatment for imparting adhesion to the adhesive rubber layer 112 of the belt body 11.

The cover fabric 13 is made of woven fabric, knitted fabric, or unwoven fabric, made of yarns of cotton, polyamide fibers, polyester fibers, or aramid fibers, for example. The cover fabric 13 is suitably subjected to adhesion treatment such as RFL treatment for imparting adhesion to the belt body 11.

The wrapped V-belt B of the first embodiment can be manufactured by a known method which has been commonly used.

Second Embodiment

Figure 2:
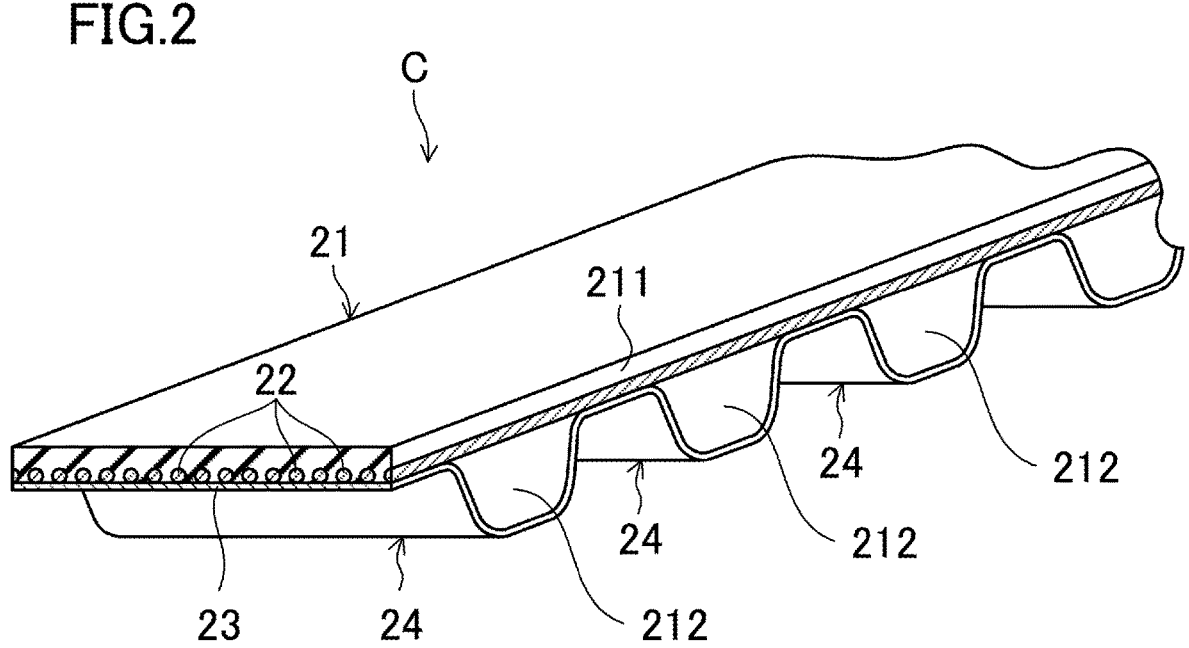
FIG. 2 is a perspective view of a piece of a toothed belt of a second embodiment.

FIG. 2 illustrates a toothed belt C (a power transmission belt) of a second embodiment. The toothed belt C of the second embodiment is, for example, a meshing transmission belt used as a power transmission member for an automobile or an industrial machine.

The toothed belt C of the second embodiment includes an endless belt body 21 made of rubber. The belt body 21 includes a backface rubber portion 211 constituting an outer side of the belt and a plurality of toothed rubber portions 212 constituting an inner side of the belt. The backface rubber portion 211 is formed in a flat belt shape. The plurality of toothed rubber portions 212 are arranged at a constant pitch at intervals in a belt length direction, and are integrally provided with the backface rubber portion 211. The toothed rubber portion 212 has a trapezoidal shape whose width increases from the inner side of the belt to the outer side of the belt as viewed laterally, and is formed to extend in a belt width direction.

The toothed belt C of the second embodiment includes a cord 22 embedded in a portion of the backface rubber portion 211 on the inner side of the belt. The cord 22 is provided to extend in a circumferential direction to form a helical pattern with pitches in the belt width direction.

The toothed belt C of the second embodiment includes cover fabric 23 provided to cover a surface of the belt body 21 provided with the toothed rubber portions 212 on the inner side of the belt. With this configuration, in the toothed belt C of the second embodiment, the toothed rubber portions 212 are covered with the cover fabric 23 to form trapezoidal toothed portions 24 extending in the belt width direction. The toothed portion 24 may be a helical tooth extending in a direction inclined with respect to the belt width direction, or may be a round tooth having a semicircular shape as viewed laterally.

The backface rubber portion 211 and the toothed rubber portions 212 are all made of crosslinked rubber compositions. The toothed belt C of the second embodiment is used with the toothed portions 24 engaging with toothed portions of a pulley. The cover fabric 23 on the surface on the inner side of the belt thus forms a pulley contacting portion. Thus, the backface rubber portion 211 and the toothed rubber portions 212 each form a pulley non-contacting portion made of the rubber composition contained in the toothed belt C of the second embodiment.

At least one of the backface rubber portion 211 or the toothed rubber portion 212 is made of a rubber composition A. Thus, one of the backface rubber portion 211 or the toothed rubber portion 212 or both of them may be made of the rubber composition A. Both of the backface rubber portion 211 and the toothed rubber portion 212 are suitably made of the rubber composition A in terms of obtaining excellent durability.

The cord 22 is made of a twisted yarn of glass fibers, aramid fibers, carbon fibers, metal fibers, and the like. The cord 22 is suitably subjected to adhesion treatment such as RFL treatment for imparting adhesion to the backface rubber portion 211 of the belt body 21.

The cover fabric 23 is made of woven fabric, knitted fabric, or unwoven fabric made of yarns of cotton, polyamide fibers, polyester fibers, or aramid fibers, for example. The cover fabric 23 is suitably subjected to adhesion treatment such as RFL treatment for imparting adhesion to the belt body 21.

The toothed belt C of the second embodiment can be manufactured by a known method which has been commonly used.

Other configurations, features, and advantages are the same as those of the first embodiment.

OTHER EMBODIMENTS

In the wrapped V-belt B of the first embodiment and the toothed belt C of the second embodiment, at least a portion of the belt body 11, 21 is made of the rubber composition A, but the present disclosure is not particularly limited thereto. The V-belt or the V-ribbed belt may be configured such that cover fabric or a rubber layer is provided at a pulley contacting portion and an inner rubber portion of a pulley non-contacting portion inside the pulley contacting portion may be made of the rubber composition A.

EXAMPLES (Wrapped V-Belt)
Wrapped V-belts of Examples 1 to 4 and Comparative Examples 1 to 3 were produced. A rubber composition forming each belt body is shown in Table 1.

Example 1

Kraft pulp was added to water such that the content of the kraft pulp reached 1% by mass, and the resultant mixture was preliminarily mixed with a stirrer and then charged into a micronizing device (Star Burst manufactured by Sugino Machine Limited). Subsequently, a process of pressurizing the mixture up to the 150 MPa and then causing the mixture to collide with a ceramic ball was repeated a total of eight times. In this manner, an aqueous dispersion of cellulose-based fine fibers manufactured by mechanically-defibrating means was prepared.

The aqueous dispersion of the cellulose-based fine fibers was mixed with sulfur-modified CR latex such that the content of the cellulose-based fine fibers reached 3 parts by mass relative to 100 parts by mass of sulfur-modified CR of a rubber component of the sulfur-modified CR latex, and the resultant mixture was air-dried and solidified.

The solid CR-cellulose-based fine fiber composite was charged into a rubber kneader and was kneaded, and then, 25 parts by mass of a hydrophilic inorganic filler (silica), 5 parts by mass of carbon black (an FEF arithmetic average particle diameter: 43 μm), 5 parts by mass of a plasticizer (DOS), 1 part by mass of a processing aid (stearic acid), 3 parts by mass of an antioxidant, 5 parts by mass of magnesium oxide, and 5 parts by mass of zinc oxide relative to 100 parts by mass of the sulfur-modified CR as the rubber component were charged and further kneaded. In this manner, an uncrosslinked rubber composition was prepared, and then, was processed into a sheet shape by a calender.

A wrapped V-belt having the same configuration as the first embodiment where an entire belt body including a compressed rubber layer, an adhesive rubber layer, and a stretch rubber layer is made of a rubber composition which is obtained by crosslinking this uncrosslinked rubber composition was produced. This wrapped V-belt was used in Example 1. The uncrosslinked rubber composition is arranged such that a grain direction thereof corresponds to a belt width direction and a non-grain direction thereof corresponds to a belt length direction. As a cord, a twisted yarn of polyester fibers which had been subjected to RFL treatment and rubber cement treatment was used. As cover fabric, woven fabric made of nylon fibers which had been subjected to adhesion treatment was used. The belt size was 1100 mm in length, 16.7 mm in width, and 9.0 mm in thickness.

Example 2

A wrapped V-belt having the same configuration as Example 1 was produced, except that the content of a hydrophilic inorganic filler in a rubber composition forming a belt body was 33 parts by mass relative to 100 parts by mass of sulfur-modified CR of a rubber component and the rubber composition contained no carbon black. This wrapped V-belt was used in Example 2.

Example 3

A wrapped V-belt having the same configuration as Example 1 was produced, except that the content of a hydrophilic inorganic filler in a rubber composition forming a belt body was 18 parts by mass relative to 100 parts by mass of sulfur-modified CR of a rubber component and the content of carbon black in the rubber composition was 10 parts by mass relative to 100 parts by mass of the sulfur-modified CR as the rubber component. This wrapped V-belt was used in Example 3.

Example 4

A wrapped V-belt having the same configuration as Example 1 was produced, except that the content of a hydrophilic inorganic filler in a rubber composition forming a belt body was 5 parts by mass relative to 100 parts by mass of sulfur-modified CR of a rubber component and the content of carbon black in the rubber composition was 20 parts by mass relative to 100 parts by mass of the sulfur-modified CR as the rubber component. This wrapped V-belt was used in Example 4.

Comparative Example 1

A wrapped V-belt having the same configuration as Example 1 was produced, except that a rubber composition forming a belt body contained no hydrophilic inorganic filler and the content of carbon black in the rubber composition was 30 parts by mass relative to 100 parts by mass of sulfur-modified CR of a rubber component. This wrapped V-belt was used in Comparative Example 1.

Comparative Example 2

A wrapped V-belt having the same configuration as Example 1 was produced, except that sulfur-modified CR obtained by air-drying and solidifying sulfur-modified CR latex was used instead of a CR-cellulose-based fine fiber composite, the content of a hydrophilic inorganic filler in a rubber composition forming a belt body was 65 parts by mass relative to 100 parts by mass of the sulfur-modified CR of a rubber component, and the rubber composition contained no carbon black. This wrapped V-belt was used in Comparative Example 2.

Comparative Example 3

A wrapped V-belt having the same configuration as Example 1 was produced, except that sulfur-modified CR obtained by air-drying and solidifying of sulfur-modified CR latex instead of a CR-cellulose-based fine fiber composite was used, a rubber composition forming a belt body contained no hydrophilic inorganic filler, and the content of carbon black in the rubber composition was 50 parts by mass relative to 100 parts by mass of the sulfur-modified CR of a rubber component. This wrapped V-belt was used in Comparative Example 3.

TABLE 1

|  | Examples | | | | Comparative Examples | | |
|---|---|---|---|---|---|---|---|
|  | 1 | 2 | 3 | 4 | 1 | 2 | 3 |
| Rubber Component (Sulfur-Modified CR) | 100 | 100 | 100 | 100 | 100 | 100 | 100 |
| Cellulose-Based Fine Fibers X | 3 | 3 | 3 | 3 | 3 | 0 | 0 |
| Hydrophilic Inorganic Filler (Silica) Y | 25 | 33 | 18 | 5 | 0 | 65 | 0 |
| Carbon Black (FEF) Z | 5 | 0 | 10 | 20 | 30 | 0 | 50 |
| Plasticizer (DOS) | 5 | 5 | 5 | 5 | 5 | 5 | 5 |
| Processing Aid (Stearic Acid) | 1 | 1 | 1 | 1 | 1 | 1 | 1 |
| Antioxidant | 3 | 3 | 3 | 3 | 3 | 3 | 3 |
| Magnesium Oxide | 5 | 5 | 5 | 5 | 5 | 5 | 5 |
| Zinc Oxide | 5 | 5 | 5 | 5 | 5 | 5 | 5 |
| Y/X | 8.3 | 11 | 6.0 | 1.7 | 0 | — | — |
| Y + Z | 30 | 33 | 28 | 25 | 30 | 65 | 50 |

(Test Method)

Figure 3:
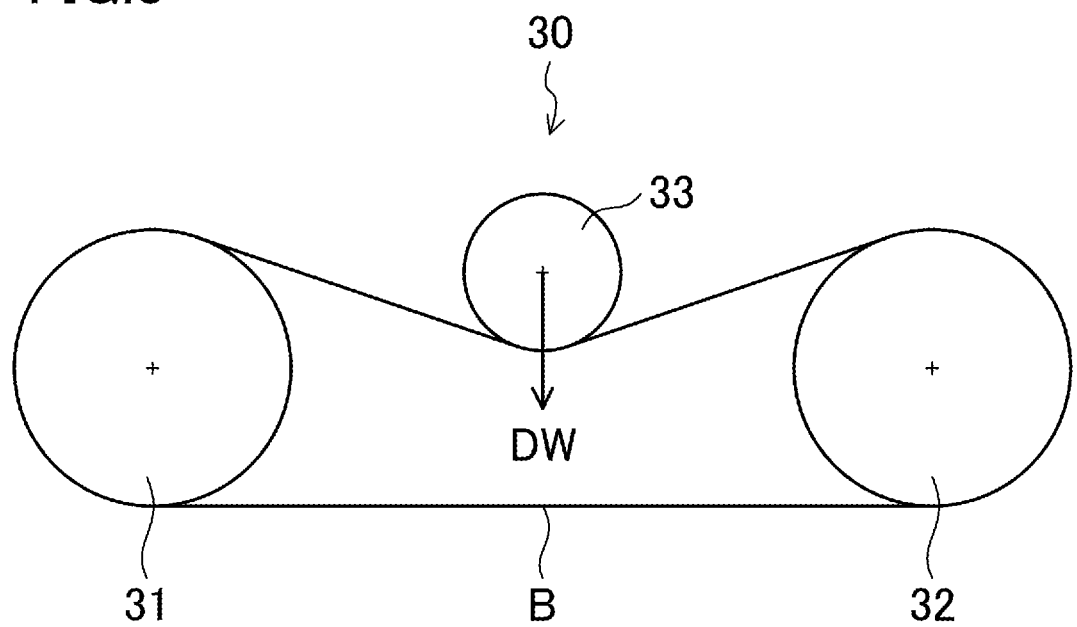
FIG. 3 is a view of a layout of pulleys of a belt running tester.

FIG. 3 illustrates the layout of pulleys of a belt running tester 30.

The belt running tester 30 includes a drive pulley 31 and a driven pulley 32 provided with a space in a right-left direction and an idler pulley 33 provided slightly above the center between shafts of the drive pulley 31 and the driven pulley 32. The drive pulley 31 and the driven pulley 32 each have a pulley diameter of 110 mm, and each have V-grooves at the outer peripheries thereof. The idler pulley 33 has a pulley diameter of 60 mm.

Each of the wrapped V-belts B of Examples 1 to 4 and Comparative Examples 1 to 3 was wrapped around the drive pulley 31 and the driven pulley 32 such that the idler pulley 33 pushed a back surface thereof on the outer side of the belt while fitting the wrapped V-belt B in V-grooves of the drive pulley 31 and the driven pulley 32. Then, under an ambient temperature of 80° C., a rotational load of 5.15 kW was applied to the driven pulley 32, while the idler pulley 33 pushed the back surface of the belt with a force of 88.3 N. In this state, the drive pulley 31 was rotated at the number of revolutions of 3000 rpm to run the belt.

First, a slip ratio was obtained at the early stage of belt running. The slip ratio is calculated based on the following expression where $N_{ro}$ is the number of revolutions of the drive pulley 31 under no load, $N_{rt}$ is the number of revolutions of the drive pulley 31 under load, $N_{n0}$ is the number of revolutions of the driven pulley 32 under no load, and $N_{nt}$ is the number of revolutions of the shaft of the driven pulley 32 under load.

$$\text{Slip Ratio} = ((I_0 - I_t)/I_0) \times 100 (\%)$$

$$(I_0 = N_{n0}/N_{ro}, I_t = N_{nt}/N_{rt})$$

Belt running was interrupted every 24 hours from the start of the belt running, and cracks caused on the inner side of the belt were visually checked. Then, the belt running was stopped when a crack extending to a cord was confirmed, and a belt running time at this time point was taken as a belt running lifetime. The longest belt running time was 216 hours.

The wrapped V-belt B after the belt running was cut, and the rubber hardness of a portion of the compressed rubber layer was measured with a type A durometer in accordance with JIS K 6253-3: 2012.

(Test Results)

The test results are shown in Table 2. As can be seen from Table 2, the slip ratios of Examples 1 to 4 were lower than those of Comparative Examples 1 to 3, and high durability was also obtained in Examples 1 to 4. When the rubber hardness decreases with an increase in temperature, the belt is compressed and deformed in the belt width direction and the contact pressure of the belt against the pulley decreases, whereby the belt easily slips on the pulley. However, it was assumed that in Examples 1 to 4, a decrease in the rubber hardness due to a temperature increase was reduced because the content of the carbon black was small, which reduced slip during the running under an ambient temperature of 80° C. Moreover, it was assumed that the belt running lifetime was significantly improved by the synergistic effect of reduction in heat generation due to the reduction in slip and reduction in heat generation due to the small content of the carbon black. This shows that especially in Example 1 where the content of the carbon black is small and Example 2 where no carbon black is contained, the rubber hardness after the belt running is slower and hardening progresses slower than the other examples, whereby a capacity for durability was left.

TABLE 2

|  | Examples | | | | Comparative Examples | | |
|---|---|---|---|---|---|---|---|
|  | 1 | 2 | 3 | 4 | 1 | 2 | 3 |
| Slip Ratio % | 1.2 | 1.2 | 1.3 | 1.4 | 1.5 | 1.8 | 1.9 |
| Running Lifetime hour | >216 | >216 | >216 | 192 | 144 | 96 | 96 |
| Rubber Hardness after Running (JIS-A) | 80 | 81 | 83 | 85 | 84 | 84 | 85 |

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A power transmission belt comprising:
a pulley non-contacting portion made of a rubber composition,
the rubber composition containing a rubber component, cellulose-based fine fibers dispersed in the rubber component and having an average fiber diameter of 10 nm or more to 1000 nm or less, and a non-carbon black hydrophilic inorganic filler and containing no carbon black or containing carbon black in an amount of less than 20 parts by mass relative to 100 parts by mass of the rubber component, the rubber component made predominantly of chloroprene rubber, sulfur-modified chloroprene rubber, ethylene-α-olefin elastomer, chlorosulfonated polyethylene rubber, hydrogenated acrylonitrile rubber, or combinations thereof.

2. The power transmission belt of claim 1, wherein the cellulose-based fine fibers include cellulose-based fine fibers formed by mechanically-defibrating means.

3. The power transmission belt of claim 1, wherein a content of the cellulose-based fine fibers in the rubber composition is 1 part by mass or more to 20 parts by mass or less relative to 100 parts by mass of the rubber component.

4. The power transmission belt of claim 1, wherein the hydrophilic inorganic filler includes silica.

5. The power transmission belt of claim 1, wherein a content of the hydrophilic inorganic filler in the rubber composition is 3 parts by mass or more to 50 parts by mass or less relative to 100 parts by mass of the rubber component.

6. The power transmission belt of claim 1, wherein a ratio of the content of the hydrophilic inorganic filler to the content of the cellulose-based fine fibers in the rubber composition is 1.0 or more to 15 or less.

7. The power transmission belt of claim 1, wherein the content of the hydrophilic inorganic filler in the rubber composition is greater than the content of the cellulose-based fine fibers.

8. The power transmission belt of claim 1, wherein the rubber composition contains carbon black, and the carbon black includes FEF.

9. The power transmission belt of claim 8, wherein a sum of the content of the hydrophilic inorganic filler and the content of the carbon black in the rubber composition is 20 parts by mass or more to 40 parts by mass or less relative to 100 parts by mass of the rubber component.

* * * * *